US006871486B2

United States Patent
Moehnke et al.

(10) Patent No.: US 6,871,486 B2
(45) Date of Patent: Mar. 29, 2005

(54) CHAIN LINK WITH ANGULARLY DISPOSED END PORTIONS

(75) Inventors: Michael D. Moehnke, Springdale, WA (US); Stephen P. Doan, Oregon City, OR (US); Richard John Stewart, Mackay (AU); David Garnet John Conroy, Bucasia (AU); Martin Charles Simpson, Andergrove (AU); James Anthony Russell, Glenella (AU); Peter Alan Lude, Eimeo (AU)

(73) Assignee: Columbia Steel Casting Co., Inc., Portland, OR (US)

( * ) Notice: Subject to any disclaimer, the term of this patent is extended or adjusted under 35 U.S.C. 154(b) by 0 days.

(21) Appl. No.: 10/746,896

(22) Filed: Dec. 23, 2003

(65) Prior Publication Data

US 2004/0139719 A1 Jul. 22, 2004

Related U.S. Application Data

(63) Continuation of application No. 10/146,015, filed on May 14, 2002, now abandoned.

(51) Int. Cl.$^7$ .......................... F16G 13/12; B21L 17/00
(52) U.S. Cl. ............................................. 59/78; 59/84
(58) Field of Search ............................... 59/78, 83, 84, 59/93

(56) References Cited

U.S. PATENT DOCUMENTS

| 152,547 | A | 6/1874 | Bradford |
| 507,347 | A | 10/1893 | Atwood |
| 856,947 | A | 6/1907 | Ecseghy |
| 932,680 | A | 8/1909 | Corbett |
| 1,198,060 | A | 9/1916 | Ryan |
| 1,257,398 | A | 2/1918 | Roach |
| 1,260,065 | A | 3/1918 | Ryan |
| 1,914,106 | A | 6/1933 | Bristol et al. |
| 3,181,257 | A | 5/1965 | Larsen |
| 3,796,246 | A | 3/1974 | Walenta |
| 3,996,737 | A | 12/1976 | Burstall |
| 4,060,978 | A | 12/1977 | McBain et al. |
| 4,279,122 | A | 7/1981 | Rogers |
| 4,467,598 | A | 8/1984 | Wells |
| 6,170,248 | B1 | 1/2001 | Ianello et al. |

*Primary Examiner*—David Jones
(74) *Attorney, Agent, or Firm*—Klarquist Sparkman, LLP

(57) ABSTRACT

A chain link has a substantially centrally located juncture section with a first eye portion integrally connected to one end of the juncture section and a second eye portion integrally connected to the opposite end of the juncture section. The eye portions extend longitudinally outwardly from opposite ends of the juncture section and are disposed at a substantial angle relative to each other at opposite ends of the link. Such link may be connected to contiguous links to form a segment of a chain, with all of the links in a segment of chain thus produced having substantially the same orientation when the chain is held straight.

32 Claims, 4 Drawing Sheets

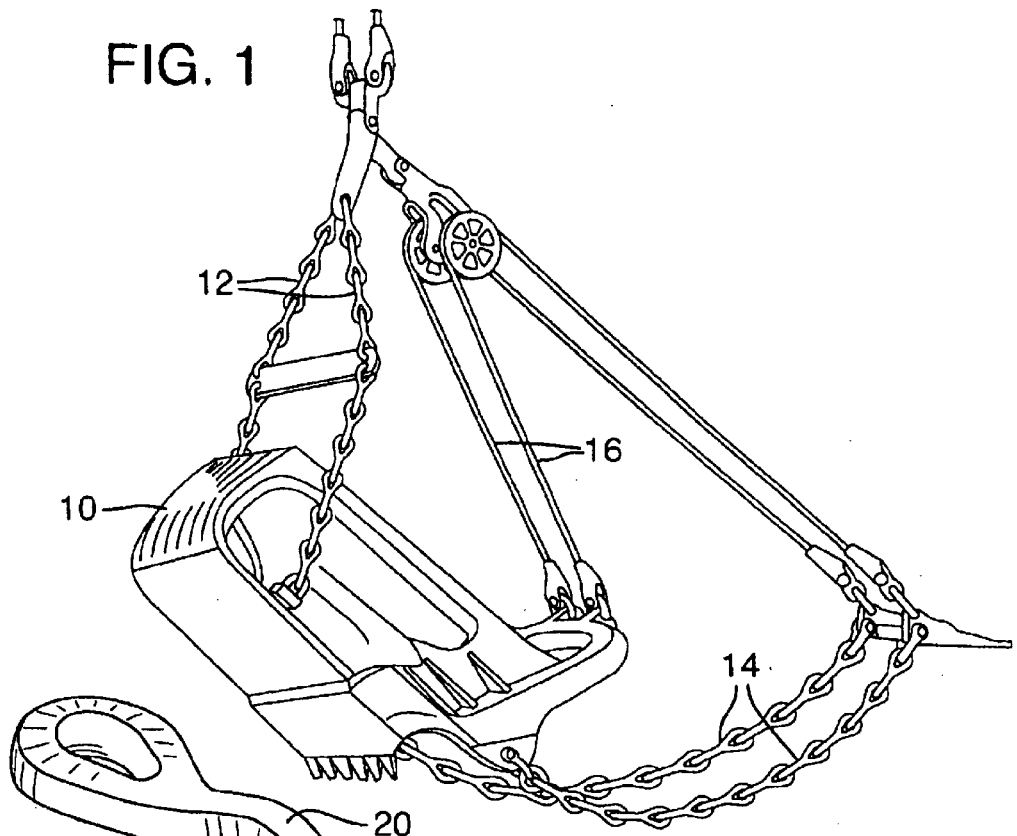
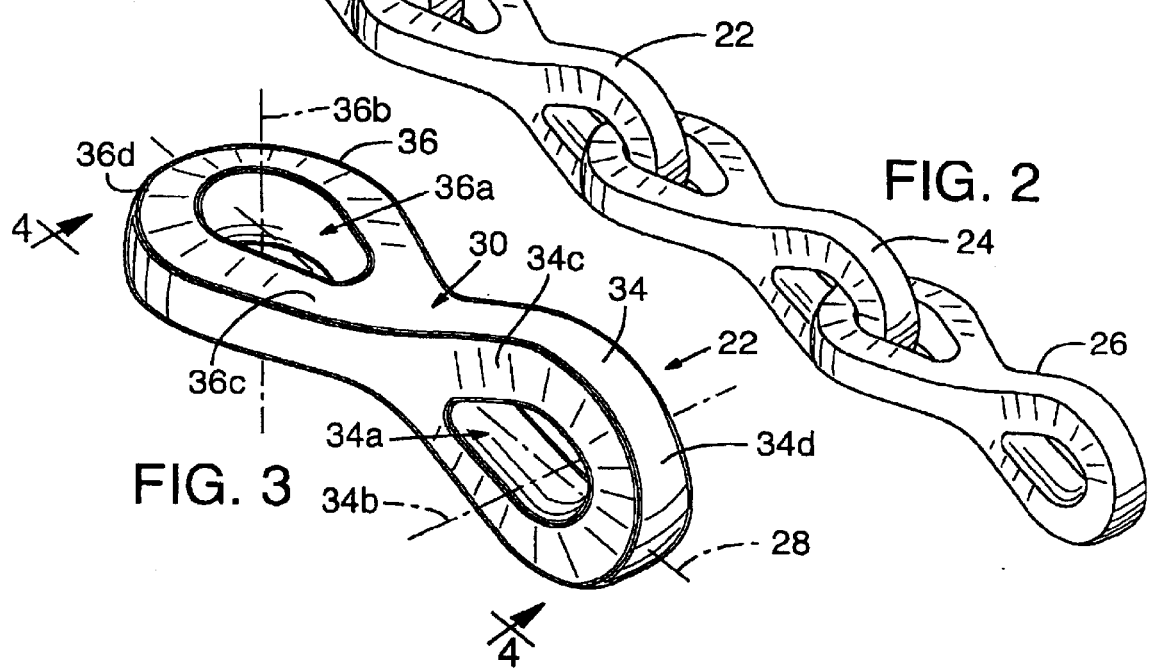

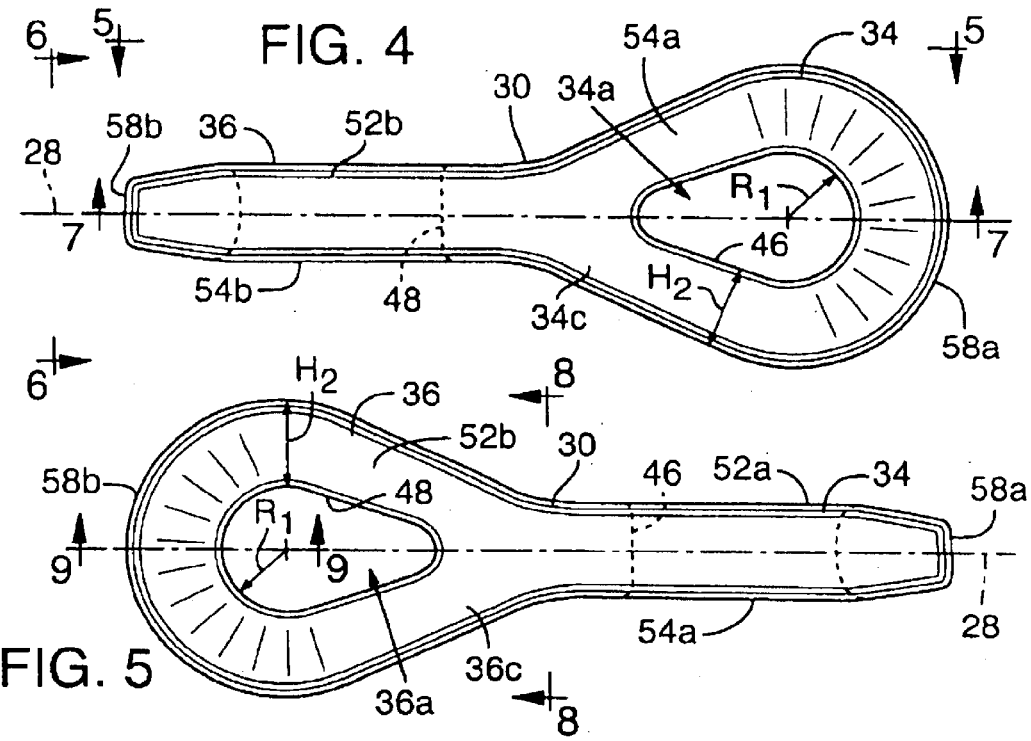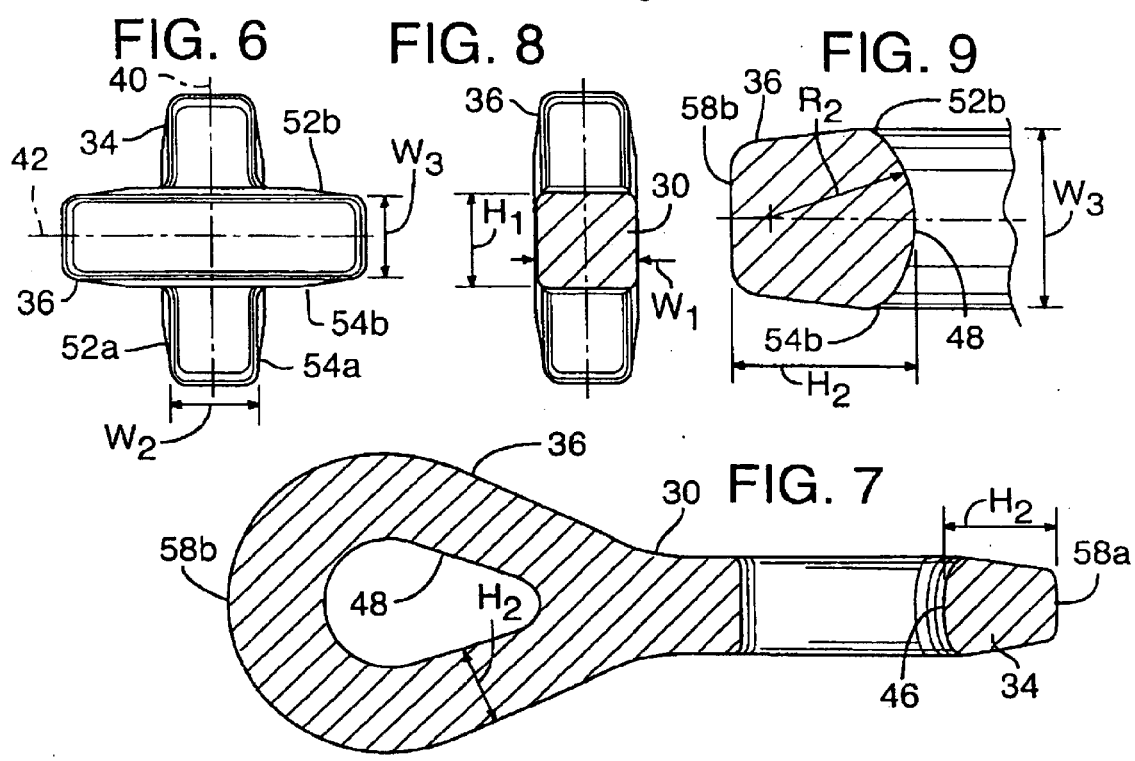

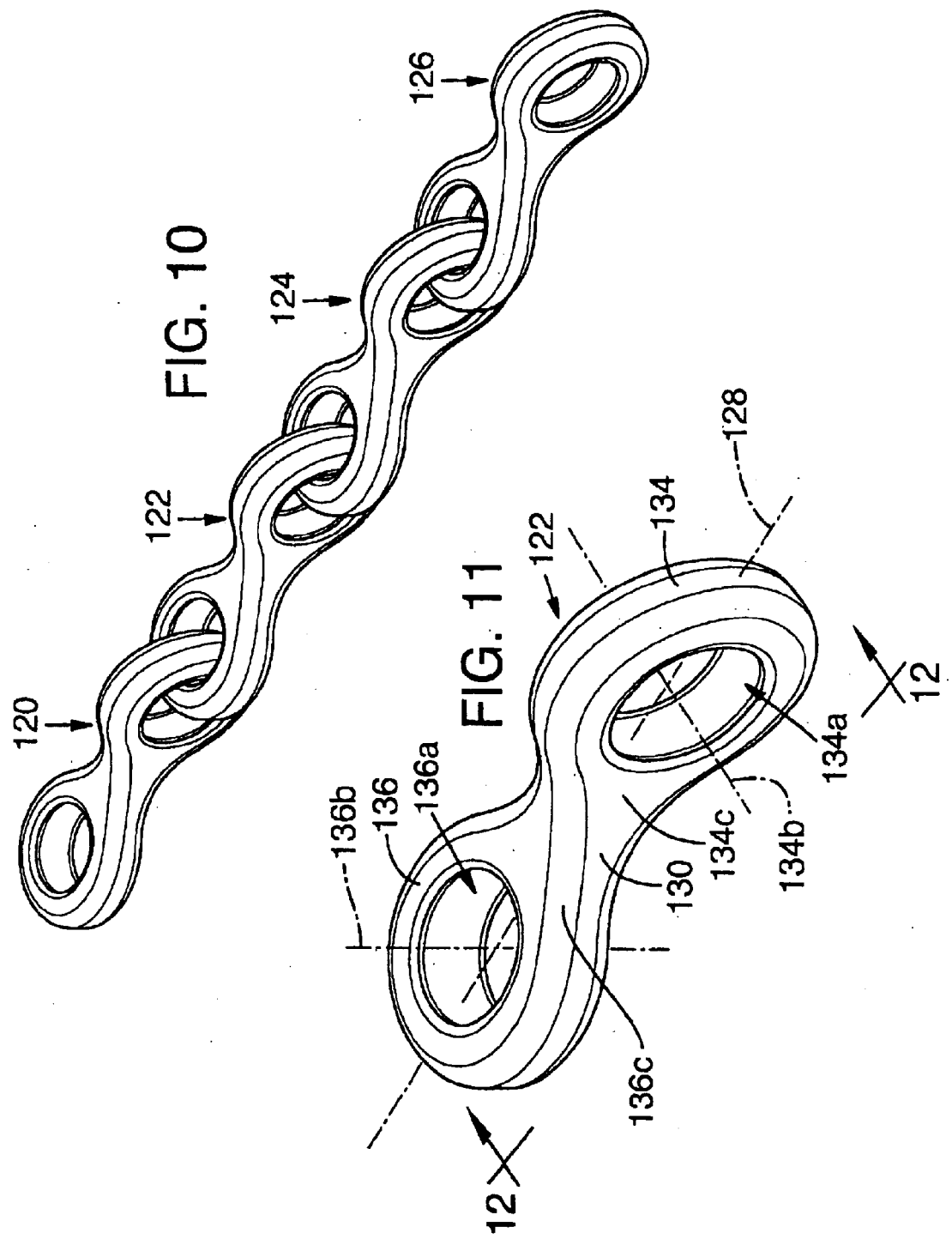

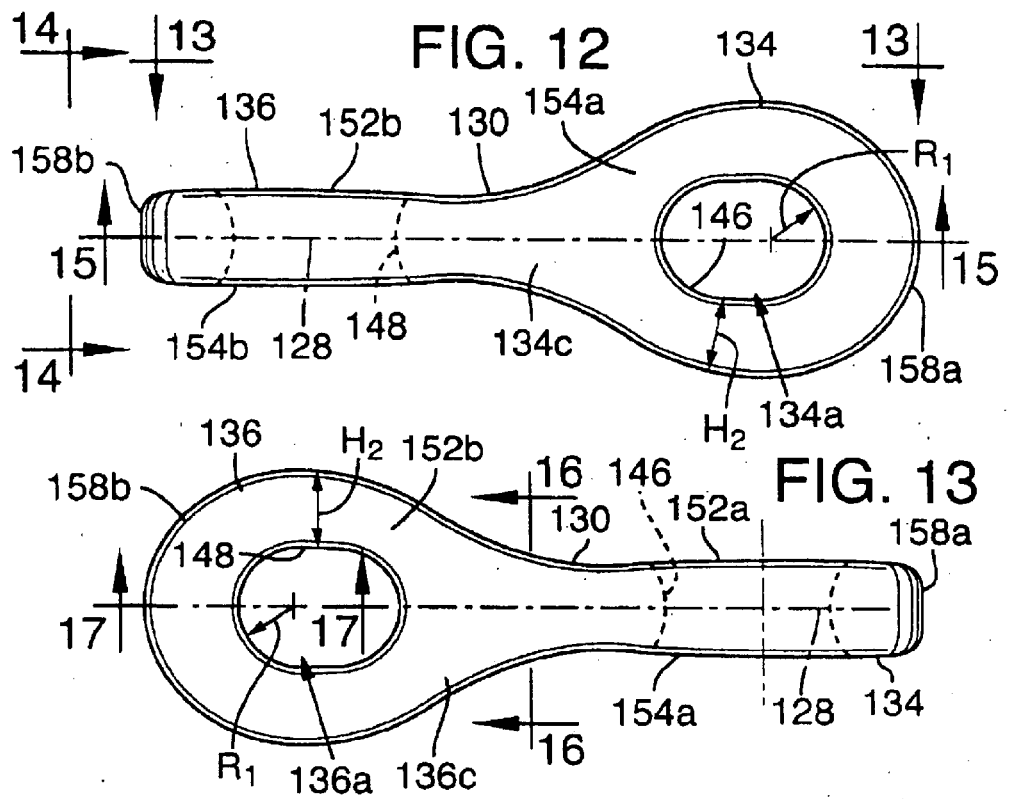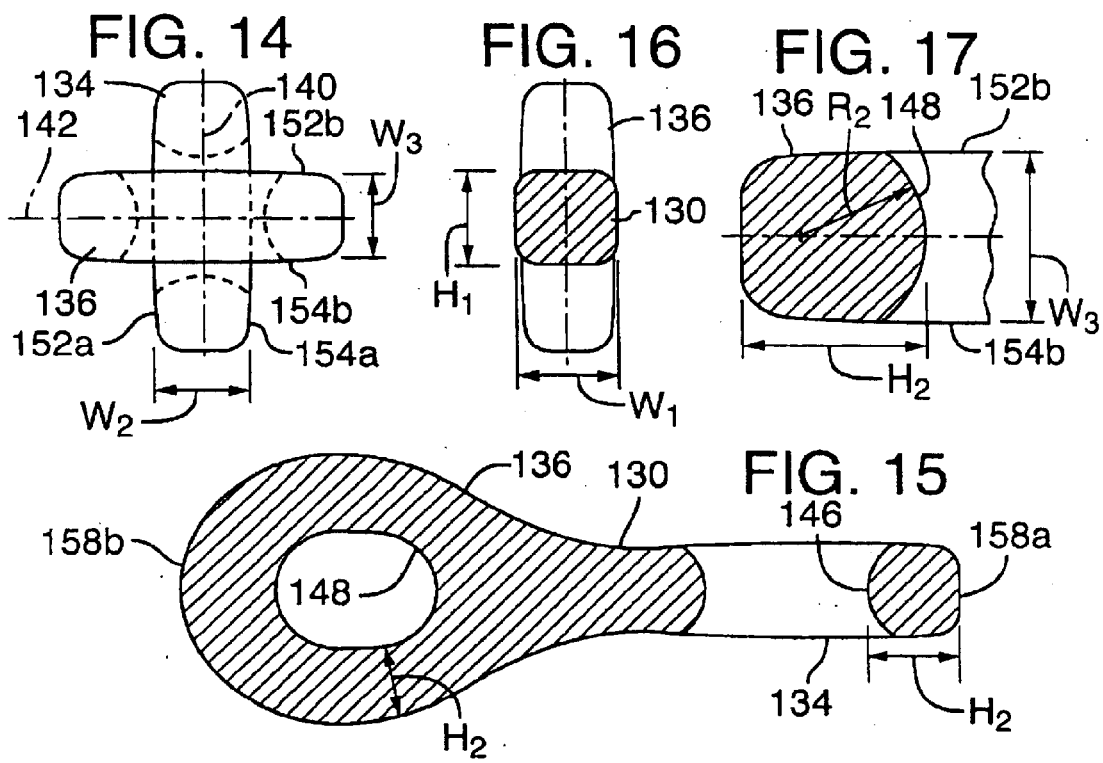

CHAIN LINK WITH ANGULARLY DISPOSED END PORTIONS

CROSS REFERENCE TO RELATED APPLICATION

This application is a continuation of U.S. patent application Ser. No. 10/146,015 filed May 14, 2002, now abandoned which is incorporated herein by reference.

FIELD

The present invention pertains to chains and chain links in general and more specifically to such chains and chain links adapted for use as hoist chains for heavy equipment.

BACKGROUND

Many forms of heavy equipment require chains which have very large load hoisting, or lifting, capabilities. One such field of use for heavy lifting chains is in draglines which are commonly used for removing large volumes of material, such as dirt, loosened ore, etc. Draglines work by dragging a large bucket along the surface to scoop up material and are available in a variety of sizes.

Heavy equipment, in the form of draglines are some of the most massive mobile equipment produced, with the largest having capacities in excess of 100 cubic yards per bucket load.

The loads on the hoist and drag chains and their links of such equipment are massive. These loads dictate the use of specialized chain links made from high strength alloy steels. In addition, these chains and chain links must be designed to endure a tremendous amount of wear.

The structure and operation of a typical dragline requiring such massive and high load carrying chains and links is described in U.S. Pat. No. 6,170,248 which is incorporated herein by reference.

Heavy equipment such as, but not limited to, draglines produces a need for chain incorporating chain links having a rather massive, or substantial, cross-section and structure which is capable of withstanding the high loads imposed thereon.

SUMMARY

An object of the invention is to provide a chain link that can be used in chains for heavy equipment and is suited for high-load applications.

Another object is to provide a chain having links which are so configured that multiple contiguous links may be assembled in the chain in substantially the same orientation.

The chain link of one embodiment has a substantially centrally located juncture section, a first eye portion integrally connected to one end of the juncture section and a second eye portion integrally connected to the opposite end of the juncture section, with the first eye portion being disposed at a substantial angle relative to the second eye portion.

In an embodiment of the invention the first eye portion occupies a first plane and the second eye portion occupies a second plane and the first and second planes are disposed substantially normal to each other. With such configuration contiguous chain links may be assembled in a length of chain with the eye portion of a link at one of its ends disposed substantially horizontally and the eye portion at the opposite end disposed substantially vertically, such that the horizontally disposed eye portion of one may interconnect with the vertically disposed eye portion of a contiguous link throughout the length of the interconnected links.

In an embodiment, the cross-section of the juncture section is substantially rectangular and each eye portion comprises a generally V-shaped root section connected to a substantially half-torus shaped end section.

In another embodiment the eye portion is substantially a major portion of a generally torus-shaped section connected to a juncture section having a substantially rectangular cross-section.

The chain link preferably is made of a high strength cast alloy steel, with the link being monolithic and cast in the configuration desired.

A chain can be fabricated by casting a first set of links and then integrally casting a second set of links, wherein each second set of links is situated between a pair of first set links and the links are oriented in an alternating fashion. Contiguous links may be disposed in substantially similar orientations.

Subsequent to the casting process, the chain links preferably are heat treated to increase the hardness of their outer surfaces and tensile strength.

BRIEF DESCRIPTION OF THE DRAWINGS

FIG. 1 is a perspective view of a dragline bucket and support chains connected thereto having links of a configuration according to an embodiment of the invention;

FIG. 2 is an enlarged perspective view of a segment of one of the hoist chains showing a number of interconnected chain links according to an embodiment of the invention;

FIG. 3 is an enlarged illustration of a single chain link removed from the segment illustrated in FIG. 2;

FIG. 4 is an enlarged side elevation view of the chain link taken generally along the line 4—4 in FIG. 3;

FIG. 5 is a top plan view of the chain link taken generally along the line 5—5 in FIG. 4;

FIG. 6 is an end view taken generally along the line 6—6 in FIG. 5;

FIG. 7 is a cross-sectional view taken generally along the lines 7—7 in FIG. 4;

FIG. 8 is a cross-sectional view taken generally along the line 8—8 in FIG. 5;

FIG. 9 is an enlarged cross-sectional view taken generally along the line 9—9 in FIG. 5;

FIG. 10 is an enlarged perspective view of a segment of a chain showing a number of interconnected chain links according to another embodiment of the invention;

FIG. 11 is an enlarged illustration of a single chain link removed from the segment illustrated in FIG. 10;

FIG. 12 is an enlarged side elevation view of the chain link taken generally along the line 12—12 in FIG. 11;

FIG. 13 is a top plan view of the chain link taken generally along the line 13—13 in FIG. 12;

FIG. 14 is an end view taken generally along the line 14—14 in FIG. 12;

FIG. 15 is a cross-sectional view taken generally along the line 15—15 in FIG. 12;

FIG. 16 is a cross-sectional view taken generally along the line 16—16 in FIG. 13; and FIG. 17 is an enlarged cross-sectional view taken generally along the line 17—17 in FIG. 13.

DETAILED DESCRIPTION

Referring the drawings, and first more specifically to FIG. 1, a large dragline bucket 10 is shown supported by hoist chains 12, drag chains 14, and dump cables 16. This entire assembly would be suspended from the end of the boom of a dragline machine and is capable of being manipulated to dig, or scrape, a quantity of material to substantially fill bucket 10 and be transported to a dumping location, and the contents then dumped.

FIG. 2 shows a segment of chain such as could be used for hoist chains 12 or drag chains 14. The chain links in the segment illustrated are constructed according to a first embodiment of the present invention.

The segment of chain illustrated includes four substantially similar chain links indicated generally at 20, 22, 24, 26, respectively. The links are pivotally connected in series and all are disposed in substantially the same orientation when the length of chain is held straight as shown in FIG. 2.

Referring to FIGS. 3–7, a chain link, such as 22, is illustrated in enlarged fashion removed from its interconnection with other chain links. The chain link in the embodiment illustrated is a monolithic cast metal member. It is elongate, having a longitudinal axis indicated generally at 28 in FIG. 3.

The chain link illustrated has a substantially centrally located juncture section 30, a first eye portion 34 integrally connected, or formed, to one end of the juncture section, and a second eye portion 36 integrally connected to the opposite end of the juncture section.

The eye portions have open central region 34a, 36a, respectively, with central axes 34b, 36b, respectively, extending therethrough. Central axes 34b, 36b each extend substantially perpendicular to longitudinal axis 28. Central axes 34b, 36b are disposed at a substantial angle relative to each other. In the illustrated embodiment, axes 34b, 36b extend substantially normal, or at substantially 90 degrees, relative to each other and occupy planes disposed substantially normal to each other.

Each of the eye portions comprises a generally V-shaped root section 34c, 36c, respectively, connected to a substantially half-torus shaped end section 34d, 36d.

As best seen in FIG. 8, juncture section 30 is substantially polygonal (in this case rectangular) in cross-section, having a width indicated at $W_1$ and a height $H_1$ which, in the illustrated embodiment, are substantially similar to each other. Eye portions 34, 36 as seen in FIG. 6 have a generally rectangular configuration in end view. Referring to FIG. 9, both the V-shaped root sections 34c, 36c and the half-torus shaped end sections 34d, 36d have cross-sections which are generally polygonal, or rectangular, in cross-section.

Referring to FIG. 6, it will be seen that eye portion 34 lies within, or substantially occupies, a first plane 40 and eye portion 36 lies within, or substantially occupies, a second plane 42. Planes 40, 42 are each substantially central planes for their respective eye portions. Planes 40, 42 occupied by eye portions 34, 36, respectively, are disposed at a substantial angle relative to each other, and in the embodiment illustrated are disposed substantially normal to, or at 90 degrees relative to, each other.

As possibly best seen in FIGS. 3, 4, and 5 one end portion of juncture section 30 flares outwardly in a first plane to initiate V-shaped root section 34c, and at its opposite end portion flares outwardly in a second plane disposed at a substantial angle relative to the first plane to initiate V-shaped root section 36c.

Referring to FIGS. 4 and 5, the openings 34a, 36a have inwardly facing surfaces 46, 48, respectively. The half-torus shaped end section of each is formed in a half circle having a radius indicated generally at $R_1$ in FIGS. 4 and 5. As best seen in FIG. 9, the inner surfaces 46, 48 of the openings also are formed in a substantially convex curve having a radius indicated generally at $R_2$ in FIG. 9. It is preferable that $R_1$ and $R_2$ be substantially similar.

Eye portion 34 has opposed side walls 52a, 54a which are separated by a width indicated generally at $W_2$. Inner and outer walls 46, 58a of eye portion 34 are spaced apart by a distance, or height, indicated $H_2$. Distance $H_2$ preferably is less than twice $R_1$. Eye portion 36 has side walls 52b and 54b which are spaced apart a distance $W_3$ which is substantially equal to $W_2$ and has inner and outer walls 48, 58b which are separated by a distance $H_2$. Plane 40 substantially bisects the width $W_2$ of eye portion 34, while plane 42 substantially bisects width $W_3$ of eye portion 36.

Referring to FIGS. 10–17, another embodiment of the invention is illustrated. The chain link in this chain is similar to that previously described, except for the general configuration of the eye portions at opposite ends of each link. Since the parts of the chain and the chain links are generally similar to those set out in FIGS. 2–9, a similar numbering system will be used, with the addition of a "1" at the beginning of each number. Thus the four substantially similar chain links shown interconnected in FIG. 10 are indicated at 120, 122, 124, 126, respectively. Link 122, illustrated in greater detail in FIGS. 11–17, is constructed in a second embodiment as a monolithic cast metal member. It is elongate, having a longitudinal axis indicated generally at 128 in FIG. 11.

The chain link illustrated in FIGS. 11–17 has a centrally located juncture section 130, a first eye portion 134 integrally connected to one end of the juncture section, and a second eye portion 136 integrally connected to the opposite end of the juncture section.

The eye portions have open central regions 134a, 136a, respectively, with central axes 134b, 136b, respectively, extending therethrough. Central axes 134b, 136b each extend substantially perpendicular to longitudinal axis 128. Central axes 134b, 136b are disposed at a substantial angle relative to each other. In the illustrated embodiment they extend substantially normal, or at substantially 90 degrees, relative to each other.

Each of the eye portions comprises a substantial portion of a generally torus-shaped section integrally connected to the juncture section 130.

As best seen in FIG. 16, juncture section 130 is substantially polygonal (in this case rectangular) in cross section, having a width indicated at $W_1$ and a height $H_1$. Eye portions 134, 136, each have a generally rectangular configuration and end view as seen in FIG. 14.

Referring still to FIG. 14, it will be seen that eye portion 134, lies within, or substantially occupies, a first plane 140, and eye portion 136 lies within, or substantially occupies, a second plane 142. Planes 140, 142 are each substantially central planes for their respective eye portion. Planes 140, 142 occupied by eye portions 134, 136, respectively, are disposed at a substantial angle relative to each other, and in the embodiment illustrated are disposed substantially normal to, or at 90 degrees relative to, each other.

As possibly best seen in FIG. 11, one end portion of juncture section 130 flares outwardly in a first plane to initiate a somewhat Y-shaped root section 134c for end portion 134, and at its opposite end portion flares outwardly in a second plane disposed at a substantial angle relative to the first plane to initiate a somewhat Y-shaped root section 136c for eye portion 136.

Referring to FIGS. 12 and 13, the openings 134a, 136a, have inwardly facing surfaces 146, 148, respectively. Opposite end portions of these openings have a radius indicated generally a $R_1$ in FIGS. 12 and 13. The openings are slightly elliptical, or oval, in configuration being somewhat longer in the direction of longitudinal axis 128 than they are wide.

As best seen in FIG. 17, the inner surfaces 146, 148 of the openings also are formed in a substantially convex curve (as seen in cross-section) having a radius indicated generally at $R_2$ in FIG. 17. It is preferable that $R_1$ and $R_2$ be substantially similar.

Eye portion 134 has opposed side walls 152a, 154a which are separated by a width indicated generally at $W_2$. Inner and outer walls 146, 158a of eye portion 134 are spaced apart by a distance, or height, indicated $H_2$. Distance $H_2$ preferably is less than twice radius $R_1$. Eye portion 136 has side walls 152b and 154b which are spaced apart a distance $W_3$ which is substantially equal to $W_2$ and has inner and outer walls 148, 158b which are separated by a distance $H_2$. Plane 140 substantially bisects the width $W_2$ of eye portion 134, while plane 142 substantially bisects width $W_3$ of eye portion 136.

A chain link constructed as described herein has substantial strength and is able to be assembled with similar links, all of which are disposed in substantially the same orientation throughout the length of the segment of chain when held straight as illustrated in FIG. 2.

Explaining further, prior chains generally used a first chain link having opposite ends with central axes which were substantially parallel to each other. These required the use of intermediate cross links, wherein the cross links were disposed at substantially 90 degrees relative to the first link. With the configuration of a chain link as provided herein there is no need for intermediate cross-links disposed at an angle relative to every other link in the chain. Here each link has an upright, or vertically disposed, eye, or end, portion, at one end of the link, and a horizontally disposed eye, or end, portion, at the opposite end. This permits the chain to be assembled as illustrated in FIGS. 2 and 10, with all of the links disposed in substantially the same orientation and each providing consistent load carrying capabilities throughout the length of the chain.

Heavy load carrying capability is provided by the juncture section having substantial mass and one end flaring outwardly in one plane to initiate the root section of the first eye portion with the opposite end of the juncture section flaring outwardly in a second plane disposed at a substantial angle relative to the first plane to initiate the root section for the second eye portion. The structure of the juncture section and the root sections of the eye portions provide excellent load carrying capability due to the advantageous alignment with force vectors which occur in the link when loaded.

Since the chain link is cast as a monolithic whole with a solid central juncture section and eye portions at opposite ends of the juncture section, a tightly closed, exceptionally strong chain link is provided which minimizes the possibility of stretching, twisting out of shape, or rupturing. There is little, if any, possibility of deformation of the portion of the chain link between the eye portions due to its solid, rugged monolithic structure.

Since the inner radius $R_1$ of an eye portion opening is substantially similar to the radius $R_2$ of the convex curvature of the inner surface of its adjacent chain link, the links rest in close mating contact for excellent load transfer between the chain links during use when the chain is assembled as illustrated in FIGS. 2 and 10.

A typical link constructed according to the present embodiment may be on the order of 25 to 30 inches in overall length. Juncture section dimensions $H_1$ and $W_1$ would be approximately four inches each. $W_2$ and $W_3$ would be on order of 3.5 to 4.0 inch and $H_2$ would be on the order of 3.25 to 3.75 inch. $R_1$ and $R_2$ each would be on the order of 2.0 to 2.5 inch.

The chain links preferably are formed from a high-strength cast alloy steel. Such chain links typically have tensile strengths in excess of 150,000 psi, and more preferably in excess of 175,000 psi. The chain links are cast as monolithic members having the general configuration illustrated. Subsequent to the casting process the chain links may be heat treated to increase the surface hardness in high wear areas, such as in the bight areas where contiguous links will interengage and the outer surface areas of the link. The chain also may be made using a bimetallic composition process such as Columbia Steel's XTEND PROCESS® on surfaces that are subject to high wear.

A chain comprising one or more chain links as illustrated can be fabricated by casting a first set of links and then integrally casting a second set of links, wherein each second-set link is situated between a pair of first-set links. As seen in FIGS. 2 and 10, it is not necessary to orient alternating links in different positions in the casting process. All of the links in a segment of chain as illustrated in FIGS. 2 and 10 can be oriented substantially the same since each chain link allows connection to a contiguous chain link.

Having described the principles of the invention with reference to a detailed embodiment, it should be apparent that the invention can be modified in arrangement and detail without departing from such principles. In view of the many embodiments to which the principles of the invention can be applied, it should be understood that the detailed embodiment is exemplary only and should not be taken as limiting the scope of the invention. We claim as our invention all such embodiments as may fall within the scope and spirit of the following claims and equivalents thereto.

What is claimed is:

1. An elongate chain link for use in a chain for heavy equipment, said link comprising a substantially centrally located juncture section, a first eye portion integrally connected to one end of said juncture section and a second eye portion integrally connected to the opposite end of said juncture section, each of said eye portions having a central axis, and the central axis of the first eye portion is disposed at a substantial angle relative to the central axis of the second eye portion, each said eye portion comprises a generally V-shaped root section connected to a substantially half-torus shaped end section, and said juncture section, root section, and end section are monolithic and of substantially polygonal cross-section.

2. The chain link of claim 1, wherein said central axis of the first eye portion occupies a plane disposed substantially normal to a plane occupied by the central axis of the second eye portion.

3. The chain link of claim 1, wherein said first eye portion occupies a first plane, said second eye portion occupies a second plane, and said first and second planes are disposed substantially normal to each other.

4. The chain of claim 3, wherein said chain link has a longitudinal axis and said first eye portion and second eye portion extend outwardly from opposite ends of said juncture section along said longitudinal axis.

5. The chain link of claim 1, which has a longitudinal axis which intersects the central axis of the first eye portion and the central axis of the second eye portion.

6. The chain link of claim 1, wherein said root section and end section are each of a substantially rectangular cross-section.

7. The chain link of claim 1, wherein said one end of said monolithic juncture section flares outwardly in first plane to initiate the V-shaped root section of the first eye portion and the opposite end of said juncture section flares outwardly in a second plane disposed at a substantial angle relative to said first plane to initiate the V-shaped root section of the second eye portion.

8. The chain link of claim 1, wherein said end section has an inner face directed toward the central axis for said end portion and said inner face is substantially convex in cross-section.

9. The chain link of claim 1, wherein each of the eye portions comprises a major portion of a generally torus-shaped section.

10. The chain link of claim 9, wherein said generally torus-shaped section is substantially polygonal in cross-section.

11. The chain link of claim 9, wherein said generally torus-shaped section is substantially rectangular in cross-section.

12. The chain link of claim 9, wherein said one end of said monolithic juncture section flares outwardly in a first plane to initiate the first eye portion and the opposite end of said monolithic juncture section flares outwardly in a second plane disposed at a substantial angle relative to said first plane to initiate the second eye portion.

13. The chain link of claim 9, wherein said generally torus-shaped section has an inner face directed toward the central axis for said end portion and said inner face is substantially convex in cross-section.

14. The chain link of claim 1, wherein said juncture section has a substantially rectangular cross-section.

15. The chain link of claim 1, wherein said link is made of alloy steel.

16. The chain link of claim 1, wherein said link is made of cast alloy steel.

17. The chain link of claim 1, wherein said link is made of high-strength cast alloy steel with a tensile strength of at least 150,000 psi.

18. The chain link of claim 1, wherein said link is a monolithic member cast in the configuration described in alloy steel.

19. An elongate monolithic chain link having a longitudinal axis comprising a substantially centrally located monolithic juncture section of polygonal cross-section, a first eye portion integrally connected to one end of said juncture section and a second eye portion integrally connected to the opposite end of said juncture section, each of said eye portions extending outwardly from said juncture section along said longitudinal axis, each eye portion having an opening with a central axis, with the central axis of the first eye portion disposed at a substantial angle relative to the central axis of the second eye portion, and one end of said juncture section flares outwardly in a first plane to initiate the first eye portion and the opposite end of the juncture section flares outwardly in a second plane at a substantial angle relative to said first plane to initiate the second eye portion.

20. A chain for use in heavy equipment comprising a plurality of interconnected elongate chain links of substantially similar configuration, wherein a first one of said chain links has a contiguous second one of said chain links connected to one of its ends and a contiguous third one of said chain links connected to its opposite end, and said first, second and third chain links are all disposed in substantially the same orientation when the chain is held substantially straight, wherein each of said first, second and third links comprises a substantially centrally located monolithic juncture section of polygonal cross-section, a first eye portion integrally connected to one end of said juncture section and a second eye portion integrally connected to the opposite end of said juncture section, each of said first and second eye portions having a generally V-shaped root section, a central axis, and the central axis of the first eye portion is disposed substantially normal to the central axis of the second eye portion.

21. The chain of claim 20, wherein a chain link has a longitudinal axis and said first eye portion and second eye portion extend outwardly from opposite ends of said juncture section along said longitudinal axis.

22. The chain of claim 20, wherein the generally V-shaped root section of each eye portion is connected to a substantially half-torus shaped end section.

23. The chain of claim 20, wherein said one end of said monolithic juncture section flares outwardly in one plane to initiate the V-shaped root section of the first eye portion and the opposite end of said monolithic juncture section flares outwardly in a second plane disposed at a substantial angle relative to said one plane to initiate the V-shaped root section of the second eye portion.

24. The chain of claim 22, wherein said root section and end section are each monolithic and of substantially polygonal cross-section.

25. The chain of claim 24, wherein said root section and end section are each of a substantially rectangular cross-section.

26. The chain of claim 20, wherein each of the eye portions comprises a major portion of a generally torus-shaped section.

27. The chain of claim 26, wherein said one end of said juncture section flares outwardly in one plane to initiate the first eye portion and the opposite end of said juncture section flares outwardly in a second plane disposed at a substantial angle relative to said one plane to initiate the second eye portion.

28. The chain of claim 20, wherein said juncture section has a substantially rectangular cross-section.

29. The chain of claim 20, wherein said chain link is monolithic.

30. The chain of claim 20, wherein said link is made of cast alloy steel.

31. The chain of claim 20, wherein said link is a monolithic member cast in the configuration described in alloy steel.

32. A chain for use in heavy equipment comprising a plurality of interconnected elongate chain links of substantially similar configuration, wherein a first one of said chain links has a contiguous second one of said chain links connected to one of its ends and a contiguous third one of said chain links connected to its opposite end, and said first, second and third chain links are all disposed in substantially the same orientation when the chain is held substantially straight, each of said first, second and third links having an elongate monolithic structure of polygonal cross-section with a longitudinal axis and comprising a substantially centrally located monolithic juncture section, a first eye portion integrally connected to one end of said juncture section and a second eye portion integrally connected to the opposite end of said juncture section, each of said eye portions extending outwardly from said juncture section along said longitudinal axis, each eye portion having an opening with a central axis, with the central axis of the first eye portion disposed at a substantial angle relative to the central axis of the second eye portion, with one end of said monolithic juncture section flaring outwardly in a first plane to initiate the first eye portion and the opposite end of the monolithic juncture section flaring outwardly in a second plane at a substantial angle relative to said first plane to initiate the second eye portion.

* * * * *